US009866936B2

(12) United States Patent
Patrone et al.

(10) Patent No.: US 9,866,936 B2
(45) Date of Patent: Jan. 9, 2018

(54) MAGNETIC MOTORCYCLE STEREO

(71) Applicants: Richard L. Patrone, Middleburg, FL (US); Rohanie M. Patrone, Middleburg, FL (US)

(72) Inventors: Richard L. Patrone, Middleburg, FL (US); Rohanie M. Patrone, Middleburg, FL (US)

(73) Assignee: Richard L. Patrone, Middleburg, FL (US)

( * ) Notice: Subject to any disclaimer, the term of this patent is extended or adjusted under 35 U.S.C. 154(b) by 0 days.

(21) Appl. No.: 15/283,320

(22) Filed: Oct. 1, 2016

(65) Prior Publication Data

US 2017/0201816 A1    Jul. 13, 2017

Related U.S. Application Data

(60) Provisional application No. 62/200,494, filed on Aug. 3, 2015, provisional application No. 62/382,231, filed on Aug. 31, 2016.

(51) Int. Cl.

| | |
|---|---|
| *H04B 1/00* | (2006.01) |
| *H04R 1/02* | (2006.01) |
| *H04R 3/00* | (2006.01) |
| *H04L 27/14* | (2006.01) |
| *H04R 5/02* | (2006.01) |

(52) U.S. Cl.
CPC ............ *H04R 1/026* (2013.01); *H04R 1/025* (2013.01); *H04R 3/00* (2013.01); *H04L 27/14* (2013.01); *H04R 5/02* (2013.01); *H04R 2420/07* (2013.01); *H04R 2420/09* (2013.01); *H04R 2499/13* (2013.01)

(58) Field of Classification Search
CPC .......... H04R 1/025; H04R 1/026; H04R 3/00; H04R 5/02; H04R 2420/07; H04R 2420/09; H04R 2499/13; H04L 27/14
USPC .... 381/86, 87, 124, 300, 301, 332, 333, 386
See application file for complete search history.

(56) References Cited

U.S. PATENT DOCUMENTS

| | | | |
|---|---|---|---|
| 2004/0040992 A1* | 3/2004 | Batchelor | ................ B62J 9/008 224/413 |
| 2004/0136522 A1* | 7/2004 | Wurtz | ................ H04M 1/6058 379/430 |
| 2005/0230445 A1* | 10/2005 | Woo | ........................ A45C 15/00 224/576 |
| 2008/0025526 A1* | 1/2008 | Iwade | ..................... B60R 11/02 381/86 |
| 2009/0186576 A1* | 7/2009 | Peng | ................... H04M 1/6091 455/41.2 |
| 2010/0224661 A1* | 9/2010 | Egan | ....................... B60R 11/02 224/413 |
| 2011/0274307 A1* | 11/2011 | Lynch | ..................... H04R 1/02 381/389 |

(Continued)

*Primary Examiner* — William A Jerez Lora

(57) ABSTRACT

A portable package for mounting a stereo entertainment system to a motorcycle. The portable package comprises a cover enclosing a housing of a device comprising a FM (frequency modulation) receiver, a USB (Universal Serial Bus) port configured to receive a radio plugin, an audio input, and a SD (Secure Digital) port operatively assembled in the housing. A plurality of speakers that are operatively connected to the stereo entertainment system for an audio output are attached to the cover. The cover is configured to magnetically attach the portable package to the motorcycle.

14 Claims, 4 Drawing Sheets

(56) References Cited

U.S. PATENT DOCUMENTS

2016/0104373 A1* 4/2016 Geerlings ................ H04Q 9/00
340/5.25

* cited by examiner

US 9,866,936 B2

MAGNETIC MOTORCYCLE STEREO

CROSS REFERENCE TO RELATED APPLICATION

This application claims priority to U.S. provisional patent application No. 62/382,231 filed on Aug. 31, 2016, and U.S. provisional patent application No. 62/200,494 filed on Aug. 3, 2015, which are incorporated herein in their entirety by reference.

FIELD

The present disclosure relates to a portable package for mounting on a motorcycle.

BACKGROUND

FM or AM radio programs are transmitted over the air via radio waves. A SD card (secure digital card) is an ultra-small flash memory card designed to provide high capacity memory in a small size. SD cards are used in many small portable devices such as digital video camcorders, digital cameras, handheld computers, audio players and mobile phones.

Currently, audio stereo systems are available for motorcycle riders and passengers as motorcycle accessories which provide means by which the motorcycle rider and passenger may enjoy stereo music from a carried tape cassette player or radio receiver or other electronic devices. These systems comprise primarily two channel amplifier systems that input into the jack receptacle of tape cassette players and radio receivers amplifying the sound in each channel and then directing it to sets of earphones or headsets worn by the motorcycle driver and passenger. In many cases, earphones are fitted interior to the protective helmet worn by the rider and passenger and so oriented that the left channel of the stereo will appear in each of the left helmet earphones of the rider and passenger, and the right stereo channel appearing in the right helmet earphones of the motorcycle rider and passenger. In these cases, electrical cords connect to the earphone of each of the rider and the passenger plug into convenient connectors or jacks of the sound system to receive the stereo audio entertainment.

As the living standards rise, motorcycle just as a simple means of transport has been unable to meet the user's requirements, and therefore the installation of a variety of entertainment and practical devices on a motorcycle, becomes a field of innovation.

The function of conventional motorcycle audio equipment is relatively simple, with only music player in actual use. The system also requires to install alarms, warning lights and other electronic components, resulting in increased expenses. The installation process is cumbersome and the electronic parts easily interfere with each other, resulting in equipment being unstable, dysfunctional or a safety hazard.

It is desirable that the entertainment system be readily attached or detached. In addition, it is also desirable that the system be contained in one package which is as small as possible, and is readily carried by a person to and from the bike. It is further desirable that the package protect the electronic components from bumping of the package and from the road shocks transmitted to the package while mounted on a bike while traveling through a rough road. Further, the components of the package, and the package itself should be readily manufactured and assembled.

In order to permit a rider to enjoy sophisticated music while touring or visiting a remote place or when parked, it is necessary to provide an audio system on the motorcycle, which can exhibit at least a desired level of performance.

In conventional system, the speakers are mounted near the handle bar, which allows water and dust particles to enter into the speaker which results in functional failure of speaker and high cost of replacement.

SUMMARY

The present disclosure relates to a portable package for mounting a stereo entertainment system on a motorcycle, which can be easily attached and detached from the motorcycle.

Accordingly, the present disclosure provides a stereo entertainment system configured to be attached on a motorcycle.

One aspect of disclosure can be embodied in a portable package for a stereo entertainment system, the portable package comprising: a device including a FM (frequency modulation) receiver, a USB (Universal Serial Bus) port configured to receive a radio plugin, an audio input port, and a SD (Secure Digital) port operatively assembled in a housing; a cover enclosing the housing, the cover being configured to attach the portable package to a carrier; and one or more speakers attached to the cover, the one or more speakers being coupled to the device for audio output.

Other aspect of the disclosure can be embodied in a portable stereo entertainment package for mounting on a motorcycle, the package comprising: a device including a FM (frequency modulation) receiver, a USB (Universal Serial Bus) port configured to receive a radio plugin, an audio input, and a SD (Secure Digital) port operatively assembled in a housing; a cover enclosing the housing, the cover being configured to attach the portable package to the motorcycle; and one or more speakers attached to the cover, the one or more speakers being operatively connected to the device for audio output.

Yet other aspect of the inventive concept can be embodied in a portable package for mounting a stereo entertainment system to a motorcycle, the package comprises: a cover enclosing a housing of a device, the device including a FM (frequency modulation) receiver, a USB (Universal Serial Bus) port configured to receive a radio plugin, an audio input, and a SD (Secure Digital) port operatively assembled in the housing; wherein the cover is configured to attach the portable package to the motorcycle; and one or more speakers attached to the cover, the one or more speakers being operatively connected to the stereo entertainment system for audio output; and a magnetic attachment configured in the cover for attaching the cover to the motorcycle.

In yet further aspect of the disclosure, a toggle switch is provided which is coupled to the device and may be accessed externally from the cover. The toggle switch is configured to change the functional mode of the stereo entertainment system.

In yet further aspect of the disclosure, a remote control switch is provided which is coupled to the device and can be accessed externally and is configured to change a functional mode of the stereo entertainment system.

In yet further aspect of the disclosure, the cover enclosing the housing is a waterproof bag and thus the entire package is a waterproof entertainment system.

The components of the stereo entertainment system package include an FM receiver, port configured to receive SD card (Secure Digital Card) and a USB (Universal Serial Bus)

port configured to receive a Sirius radio plugin via USB to play the Sirius radio, and an audio jack input; the FM radio, SD port, USB port and audio jack input being assembled in a housing and secured by a package including one or more speakers operably connected to the entertainment system.

BRIEF DESCRIPTION OF THE DRAWINGS

The example embodiments of the inventive concept will be better understood from the following brief description taken in conjunction with the accompanying drawings. The FIGS. 1-4 represent non-limiting, example embodiments.

DETAIL DESCRIPTION

Figure 1:
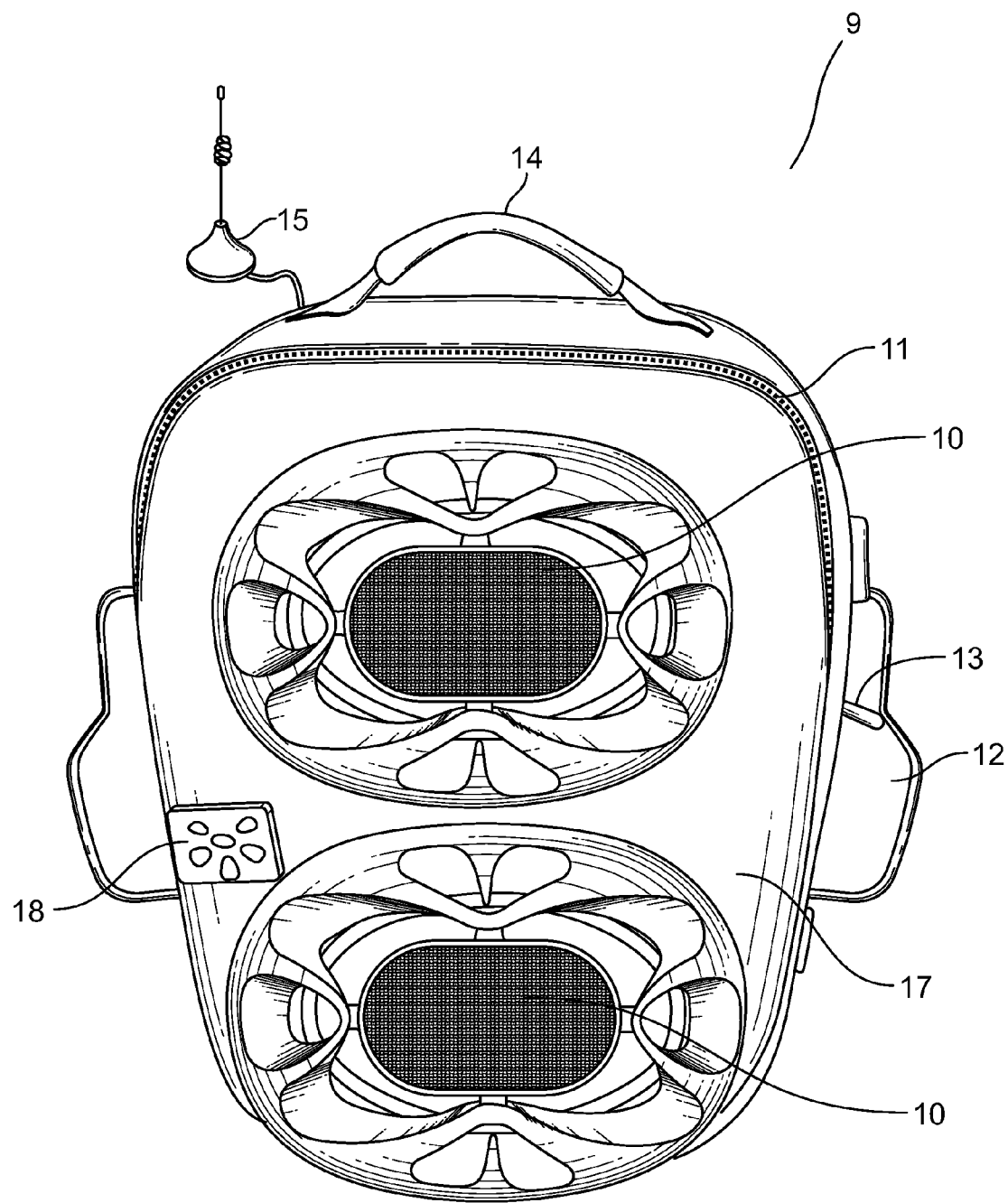
FIG. 1 shows a prospective view of the portable package according to an example embodiment.

In the following description, reference is made to the accompanying drawings which form a part hereof, and in which is shown by way of illustration specific embodiments in which the inventive concept may be practiced. These embodiments are described in sufficient detail to enable those skilled in the art to practice the inventive concept, and it is to be understood that the embodiments may be combined, or that other embodiments may be utilized and that structural and logical changes may be made without departing from the spirit and scope of the present inventive concept. The following description is, therefore, not to be taken in a limiting sense.

Example embodiments of the inventive concepts may be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, some dimensions are exaggerated for clarity.

It will be understood that when an element is referred to as being "connected" or "coupled" to another element, it can be directly connected or coupled to the other element or intervening elements may be present.

The terminology used herein is for the purpose of describing particular embodiments only and is not intended to be limiting of example embodiments of the inventive concepts. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The description that follows includes exemplary devices, methods, systems, techniques and instruction sequences products that embody techniques of the present inventive subject matter. However, it should be understood that the described embodiments may be practiced without these specific details. Well-known instruction instances, protocols, structures and techniques have not been shown in detail in order not to obfuscate the description.

Figure 2:
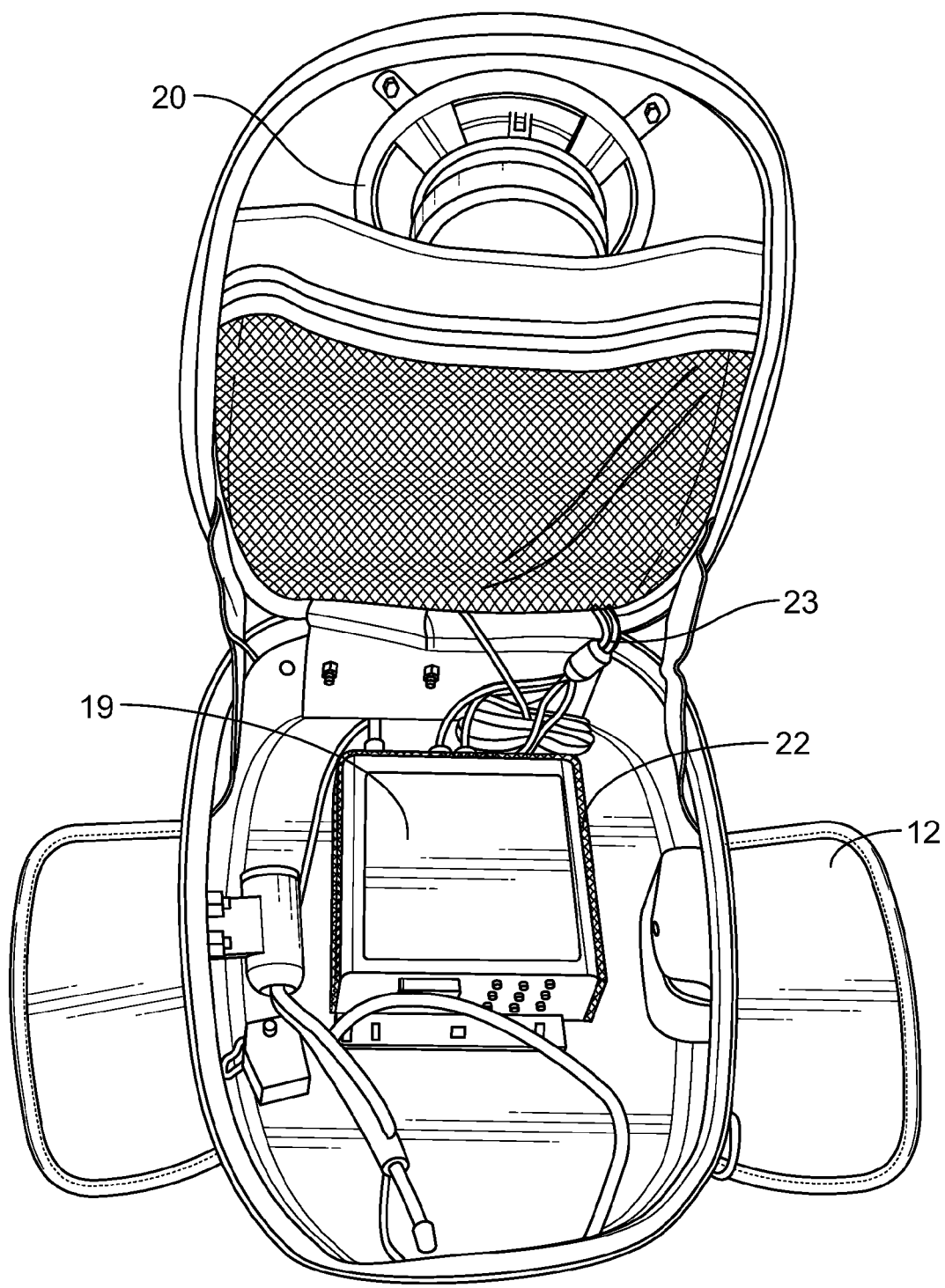
FIG. 2 shows a prospective view of the portable package showing various components inside the package according to an example embodiment.
Figure 3:
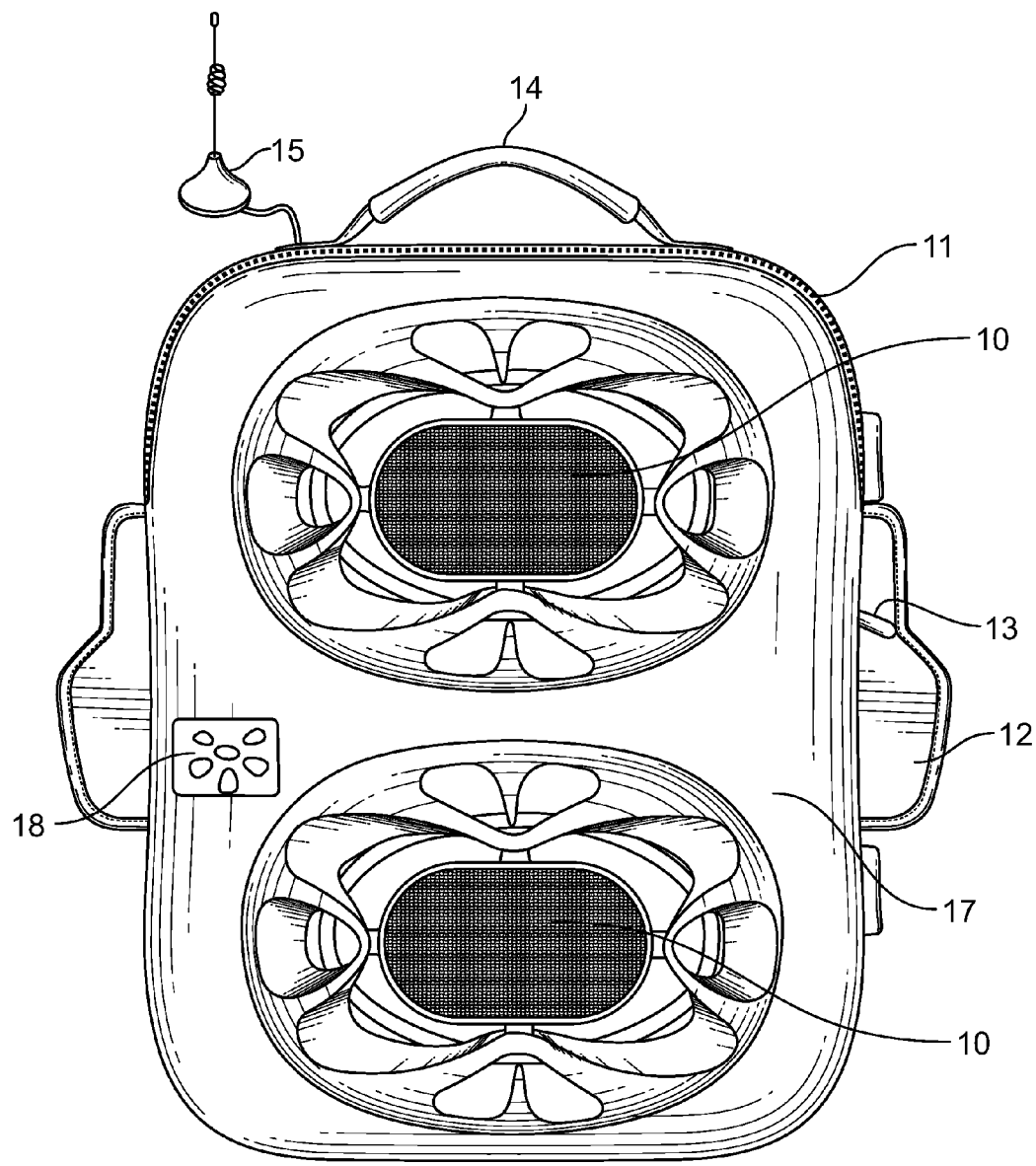
FIG. 3 shows a front view of the portable package according to an example embodiment.

FIGS. 1-2 show a portable package according to an example embodiment. Cover 17 may be a rigid nylon bag configured to enclose the various components of the entertainment system in a package. The components of the entertainment system include a FM (frequency modulation) receiver, a USB (Universal Serial Bus) port configured to receive a radio plugin, an audio input port, and a SD (Secure Digital) port which are assembled in a housing 19. The housing 19 is securely retained in a foam or fiber matrix 22. The thickness of such matrix can be between 3 centimeters to 10 centimeters. The handle 14 allows easy transportation of the package. The zipper 11 is used to securely close and lock the package.

In an example embodiment, speakers 10 are securely attached to the cover 17. The speakers 10 and the cones 20 of the speakers face away from the package through an opening formed in the cover 17. The cone 20 is attached to the cover 17 via nuts and bolts mechanism. In an example scenario, the attachment may be done by gluing the speakers to the cover via adhesive material. Several receptacles are formed inside the bag for securing smart electronic devices that are configured be coupled to the ports available in the housing 17.

In an example embodiment, a USB port is configured to be coupled to a smart device via a USB cable as a plugin for a Sirius radio for playing the radio via operatively connected speakers 10. The housing 19 may also include a FM radio receiver which is coupled to the speakers 20 for an audio output.

Figure 4:
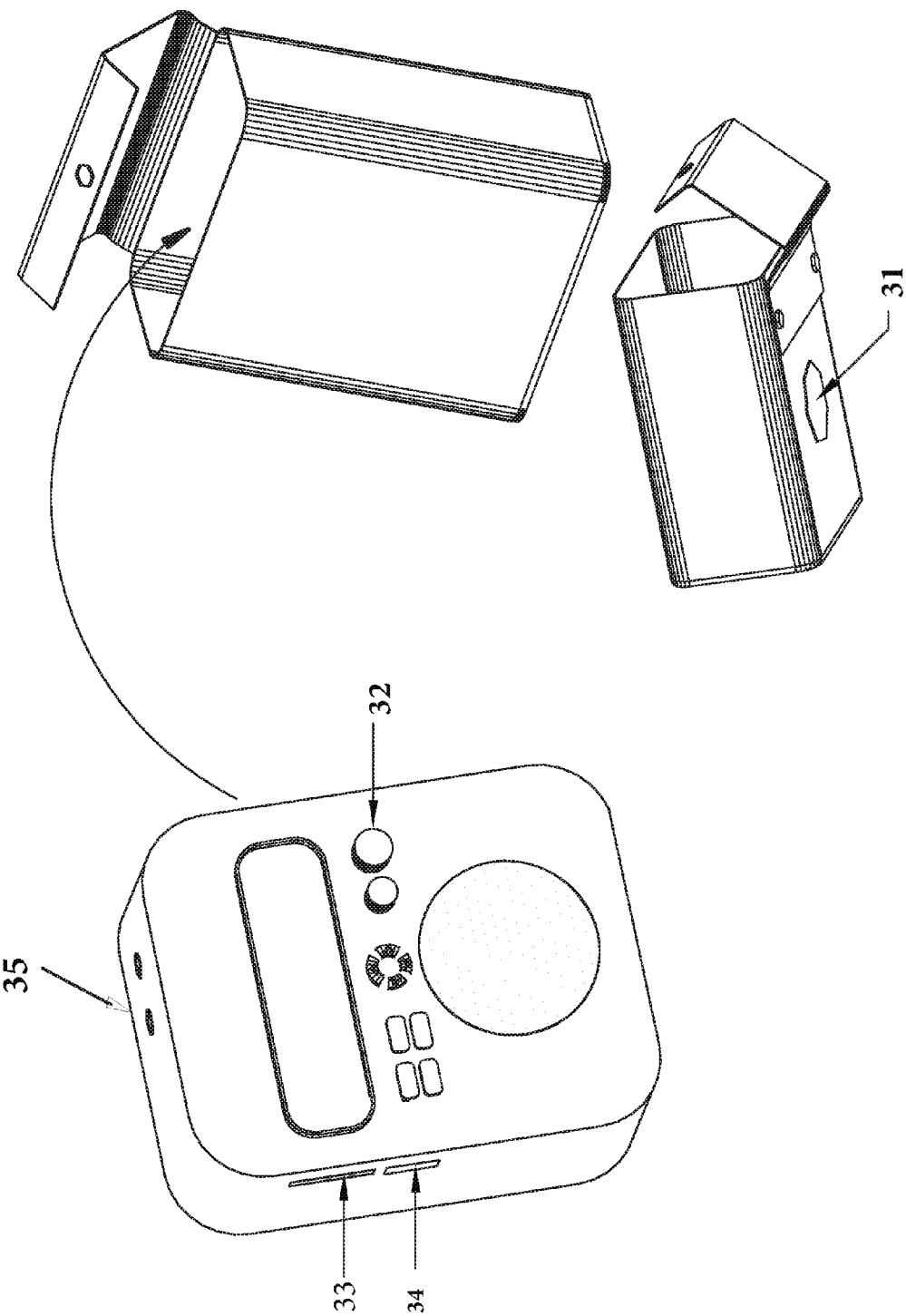
FIG. 4 shows a prospective view of the portable package according to an another example embodiment.

FIG. 4 shows a package for securely enclosing the components of the entertainment system according to an another example embodiment. SD card port 33, USB port 34, FM radio and tuner 32, and audio plug-in 35 are operatively assembled in a housing. A magnet 31 is attached to the exterior of the package for attaching the package to the motorcycle.

In yet another example embodiment, the housing may also include an audio port operatively connected to the speaker in order to play audio from the connected devices.

In yet another example embodiment, a remote control 18 is attached to the cover 17 and may be operated to control the functions of the entertainment device.

In yet another example embodiment, a toggle switch 13 is securely attached to the bag and is configured to control the functions of the entertainment device.

In yet another example embodiment, an antenna 15 is provided along with the bag and may be connected to the FM receiver for receiving wireless signals.

In yet another example embodiment, flappers 12 with embedded magnetic elements are attached to the cover for an easy attachment of the package 9 to the motor cycle.

In yet another example embodiment, a magnet of the speaker 10 may be used as an attachment means to attach the package to the motor cycle. The stereo entertainment system is configured for easy attachment and detachment from the motorcycle.

In an example embodiment, the cover 17 may be made of a heavy-duty Thermo Molded rigid 1680D nylon and 1200D polyester with PVC (polyvinyl chloride) coating and UV (ultraviolet light) protection.

In a further example embodiment, the plastic bag may include a waterproof elastic material.

In an embodiment of the present disclosure, the FM stereo may be attached to the stereo entertainment system.

In an another embodiment of the present disclosure, the SD card (Secure Digital Card) is provided with the stereo entertainment system and is configured to work as a storage device.

In another embodiment of the present disclosure, the USB (Universal Serial Bus) Sirius radio plugin is provided in the stereo entertainment system.

According to another embodiment of the present disclosure, the stereo, SD card (Secure Digital Card) and USB (Universal Serial Bus) Sirius radio plugin, and an audio input port are assembled in one package.

In an another embodiment of the present disclosure, the tuner unit of stereo entertainment system is configured to work with 12V DC system.

In an another embodiment of the present disclosure, player unit, switch cluster and speakers of stereo entertainment system are water proof.

It is to be understood that the above description is intended to be illustrative, and not restrictive. For example, the above-discussed embodiments may be used in combination with each other. Many other embodiments will be apparent to those of skill in the art upon reviewing the above description. It is to be understood that the above description is intended to be illustrative, and not restrictive. For example, the above discussed embodiments may be used in combination with each other. Many other embodiments will be apparent to those of skill in the art upon reviewing the above description.

Plural instances may be provided for components, operations or structures described herein as a single instance. Finally, boundaries between various components are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

We claim:

1. A portable stereo entertainment package for mounting on a motorcycle, the portable stereo entertainment package comprising:
   a device including a FM (frequency modulation) receiver, a USB (Universal Serial Bus) port configured to receive a radio plugin, audio input port, and a SD (Secure Digital) port, each being operatively assembled in a housing;
   a cover enclosing at least the housing in a package, the cover being configured to attach the portable stereo entertainment package to the motorcycle, the cover being made of a thermally molded nylon and a polyester with a PVC coating for water resistance and UV protection, and the cover further comprising a magnetic material embedded flexible extension configured to attach the cover to the motorcycle; and
   one or more water resistant speakers attached to the cover, the one or more speakers being operatively connected to the device for audio output.

2. The portable stereo entertainment package according to claim 1, wherein the FM receiver, the USB port, the audio input port, and the SD port are compactly assembled in the housing.

3. The portable stereo entertainment package according to claim 1, wherein the package is configured to receive an antenna to be coupled to the device.

4. The portable stereo entertainment package according to claim 1, wherein a toggle switch is coupled to the device and can be accessed externally from the cover, the toggle switch being configured to change a functional mode of the device.

5. The portable stereo entertainment package according to claim 1, wherein a remote control is coupled to the device and can be accessed externally and is configured to change a functional mode of the device.

6. The portable stereo entertainment package according to claim 5, wherein the remote control is a plugin device configured to plug into the device and is extendible to a handle bar of the motorcycle.

7. The portable stereo entertainment package according to claim 5, wherein the device includes a power receiving port configured to receive a power from a 12V dc power supply.

8. The portable stereo entertainment package according to claim 5, wherein the SD port is configured to receive a Secure Digital Card as a storage device.

9. The portable stereo entertainment package according to claim 5, wherein the device is a BLUETOOTH enabled device.

10. The portable stereo entertainment package according to claim 5, wherein the housing is enclosed in a shock absorbing material.

11. The portable stereo entertainment package according to claim 5, wherein a compartment is provided inside the cover to removably store mobile devices therein.

12. The portable stereo entertainment package according to claim 5, wherein the package is a self-contained package.

13. The portable stereo entertainment package according to claim 5, wherein the remote control is configured to change the functional mode of the BLUETOOTH enabled device by Bluetooth connection.

14. A potable stereo entertainment package for mounting on a motorcycle, the portable stereo entertainment package comprising:
   a device including a FM (frequency modulation) receiver, a USB (Universal Serial Bus) port configured to receive a radio plugin, an audio input port, and a SD (Secure Digital) port, each being operatively assembled in a housing;
   a cover enclosing at least the housing in a package, the cover being configured to attach the portable stereo entertainment package to the motorcycle, the cover being made of a thermally molded nylon and a polyester with a PVC coating for water resistance and UV protection, and the cover further comprising a magnetic material embedded flexible extension, one or more water resistant speakers attached to the cover with speakers facing outwardly through an opening in the cover, and a remote control attached to the cover, the one or more speakers being operatively connected to the device for audio output and the remote control being configured to be operated to control the functions of the portable stereo entertainment package.

* * * * *